United States Patent
Yun et al.

(10) Patent No.: US 9,736,705 B2
(45) Date of Patent: Aug. 15, 2017

(54) METHOD AND SYSTEM FOR PROXY BASE STATION

(71) Applicant: EDEN ROCK COMMUNICATIONS, LLC, Bothell, WA (US)

(72) Inventors: Jungnam Yun, Bothell, WA (US); Eamonn Gormley, Bothell, WA (US); Rekha Menon, Bothell, WA (US); Chaz Immendorf, Bothell, WA (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 14/313,923

(22) Filed: Jun. 24, 2014

(65) Prior Publication Data

US 2015/0016289 A1    Jan. 15, 2015

Related U.S. Application Data

(60) Provisional application No. 61/845,345, filed on Jul. 11, 2013.

(51) Int. Cl.
 *H04W 24/02* (2009.01)
 *H04W 88/08* (2009.01)

(52) U.S. Cl.
 CPC ............ *H04W 24/02* (2013.01); *H04W 88/08* (2013.01)

(58) Field of Classification Search
 None
 See application file for complete search history.

(56) References Cited

U.S. PATENT DOCUMENTS

| | | | | |
|---|---|---|---|---|
| 5,802,173 A | * | 9/1998 | Hamilton-Piercy | H04W 88/085 379/56.2 |
| 7,003,282 B1 | * | 2/2006 | Ekberg ................. | H04W 12/06 380/270 |
| 2007/0161381 A1 | * | 7/2007 | Chen .................... | H04W 64/00 455/456.1 |
| 2008/0134300 A1 | * | 6/2008 | Izatt ....................... | H04L 63/10 726/4 |
| 2008/0151843 A1 | * | 6/2008 | Valmikam ........... | H04W 64/003 370/338 |
| 2009/0122773 A1 | * | 5/2009 | Gogic ................... | H04W 24/02 370/338 |
| 2009/0168766 A1 | * | 7/2009 | Eyuboglu ......... | H04W 36/0022 370/353 |
| 2010/0118845 A1 | * | 5/2010 | Solver ............... | H04L 29/12339 370/338 |

(Continued)

FOREIGN PATENT DOCUMENTS

EP     2249610 A3    10/2010
WO    WO 2010/068154 A1    6/2010

(Continued)

OTHER PUBLICATIONS

International Search Report and Written Opinion for PCT/US2014/043954, filed on Jun. 24, 2014.

(Continued)

*Primary Examiner* — Andrew Oh

(57) ABSTRACT

A method for a proxy base station includes analyzing current network parameters, determining parameters for the proxy base station based on the analyzed network parameters, and transmitting the determined parameters for the proxy base station to an actual base station of the network.

20 Claims, 4 Drawing Sheets

(56) References Cited

U.S. PATENT DOCUMENTS

| | | | |
|---|---|---|---|
| 2010/0260145 A1* | 10/2010 | Voyer | H04L 63/0823 370/331 |
| 2010/0273504 A1* | 10/2010 | Bull | G01S 5/02 455/456.1 |
| 2010/0285795 A1* | 11/2010 | Whinnett | H04W 52/146 455/424 |
| 2010/0309864 A1* | 12/2010 | Tamaki | H04W 52/42 370/329 |
| 2010/0309866 A1* | 12/2010 | Katayama | H04L 5/003 370/329 |
| 2011/0176453 A1 | 7/2011 | Monogioudis | |
| 2011/0201345 A1* | 8/2011 | Han | H04W 24/02 455/450 |
| 2011/0207461 A1 | 8/2011 | Lundqvist et al. | |
| 2011/0257923 A1* | 10/2011 | Boulton | G01S 5/0221 702/117 |
| 2011/0263282 A1* | 10/2011 | Rune | H04J 11/0093 455/507 |
| 2011/0269499 A1* | 11/2011 | Vikberg | H04W 28/08 455/524 |
| 2011/0270994 A1* | 11/2011 | Ulupinar | H04W 76/025 709/227 |
| 2011/0286429 A1* | 11/2011 | Vikberg | H04W 36/0005 370/331 |
| 2011/0305339 A1* | 12/2011 | Norrman | H04W 12/04 380/270 |
| 2011/0310791 A1* | 12/2011 | Prakash | H04W 24/02 370/315 |
| 2012/0069737 A1* | 3/2012 | Vikberg | H04W 28/12 370/232 |
| 2012/0071085 A1* | 3/2012 | Gunnarsson | H04W 24/00 455/7 |
| 2012/0082058 A1* | 4/2012 | Gerstenberger | H04W 36/0083 370/252 |
| 2012/0099663 A1* | 4/2012 | Sabol | H04W 24/04 375/259 |
| 2012/0106488 A1* | 5/2012 | Nylander | H04L 29/12066 370/329 |
| 2012/0230232 A1* | 9/2012 | Ji | H04B 7/2656 370/280 |
| 2012/0257546 A1* | 10/2012 | Castleberry | H04W 76/022 370/259 |
| 2012/0322453 A1* | 12/2012 | Weng | H04W 72/02 455/450 |
| 2013/0003646 A1* | 1/2013 | Michel | H04B 7/15592 370/315 |
| 2013/0012212 A1* | 1/2013 | Murakami | H04W 36/245 455/439 |
| 2013/0021912 A1* | 1/2013 | Finlow-Bates | G01S 5/021 370/241 |
| 2013/0022010 A1* | 1/2013 | Qianxi | H04L 5/0033 370/329 |
| 2013/0044026 A1* | 2/2013 | Chen | G01S 19/07 342/357.27 |
| 2013/0064092 A1* | 3/2013 | Xi | H04W 92/20 370/235 |
| 2013/0176890 A1* | 7/2013 | Sharma | H04B 7/15557 370/252 |
| 2013/0178211 A1* | 7/2013 | Wang | H04W 24/02 455/436 |
| 2013/0183971 A1* | 7/2013 | Tamaki | H04W 36/0061 455/436 |
| 2013/0195015 A1* | 8/2013 | Takahashi | H04W 72/0406 370/328 |
| 2013/0201966 A1* | 8/2013 | Weng | H04W 72/04 370/336 |
| 2013/0215820 A1* | 8/2013 | Redana | H04W 16/26 370/315 |
| 2013/0215870 A1* | 8/2013 | Hosobe | H04W 36/0061 370/331 |
| 2013/0223325 A1* | 8/2013 | Rohit | H04W 76/02 370/315 |
| 2013/0272294 A1* | 10/2013 | Mildh | H04W 56/001 370/350 |
| 2013/0273907 A1* | 10/2013 | Vikberg | H04W 48/02 455/426.1 |
| 2014/0024306 A1* | 1/2014 | Redana | H04B 7/2606 455/7 |
| 2014/0066021 A1* | 3/2014 | Takahashi | H04W 24/10 455/411 |
| 2014/0141779 A1* | 5/2014 | Yuk | H04W 56/00 455/434 |
| 2014/0148165 A1* | 5/2014 | Serravalle | H04W 16/14 455/436 |
| 2014/0155056 A1* | 6/2014 | Jactat | H04W 16/18 455/422.1 |
| 2014/0187246 A1* | 7/2014 | Jha | H04W 48/08 455/436 |
| 2014/0248868 A1* | 9/2014 | Wang | H04W 24/10 455/422.1 |
| 2014/0328246 A1* | 11/2014 | Xu | H04W 36/08 370/315 |
| 2014/0357297 A1* | 12/2014 | Futaki | H04W 24/10 455/456.1 |
| 2014/0370894 A1* | 12/2014 | Hosdurg | H04W 36/0077 455/436 |
| 2015/0038190 A1* | 2/2015 | Carter | H04W 52/244 455/522 |
| 2015/0045032 A1* | 2/2015 | Tomici | H04W 36/04 455/436 |
| 2015/0055687 A1* | 2/2015 | Phan | H04L 63/0815 375/140 |
| 2015/0119064 A1* | 4/2015 | Takano | H04W 28/16 455/454 |
| 2015/0195032 A1* | 7/2015 | Sharma | H04B 7/15557 370/315 |
| 2015/0208296 A1* | 7/2015 | Song | H04W 36/0083 370/331 |

FOREIGN PATENT DOCUMENTS

| | | |
|---|---|---|
| WO | WO 2012/060757 A1 | 5/2012 |
| WO | WO 2013/052312 A1 | 4/2013 |

OTHER PUBLICATIONS

Ericsson, "Extending maxEARFCN", 3GPP TSG-RAN WG3 Meeting #78, Nov. 12-16, 2012, pp. 1-12, R3-122767.

Extended European Search Report for European Patent Application No. 14823490.9, dated Nov. 15, 2016.

* cited by examiner

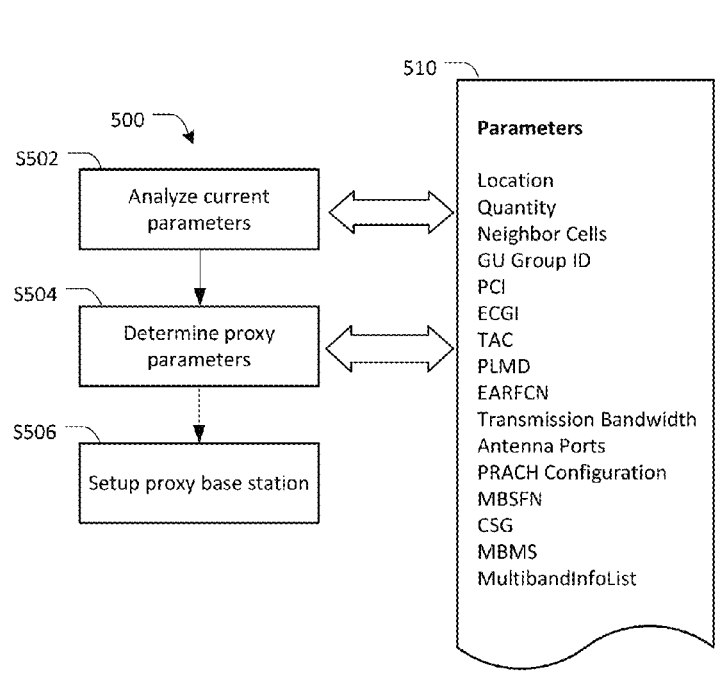
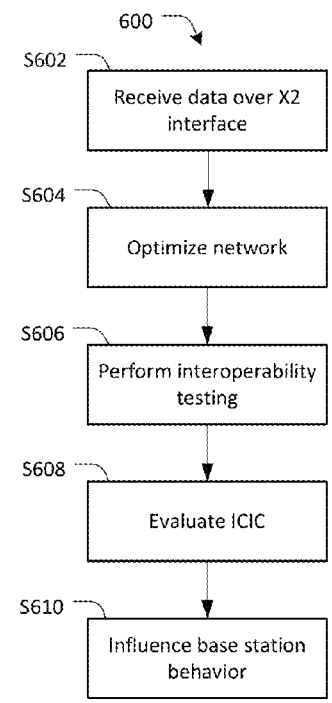
Fig. 5
Fig. 6

METHOD AND SYSTEM FOR PROXY BASE STATION

CROSS-REFERENCES TO RELATED APPLICATIONS

The present invention claims priority to U.S. Provisional Application No. 61/845,345, filed Jul. 11, 2013, which is incorporated by reference herein for all purposes.

BACKGROUND OF THE INVENTION

In order to keep pace with the rapid growth of mobile data consumption, operators are investing billions of dollars in building out 4G networks with small cells co-located with macro cells to form heterogeneous networks. They also are adopting self-organizing network (SON) solutions to manage increasingly complex networks and to solve challenges such as interference coordination between macro cells and small cells, self-installation and configuration of small cells, inbound and outbound mobility support to and from small cells, etc.

SON, in general, refers to self-configuration, self-optimization and self-healing functionality that helps to minimize operation expenditures. Some SON functions that have slow adaptations are implemented in a centralized SON, which is usually located at the network management or element management level. Some other SON algorithms that may perform independently or need fast adaptations are implemented as distributed SON and located at the network element level, e.g., the eNodeB level.

Distributed SON functionality in an eNodeB may make decisions and execute parameter changes independently and quickly. Hence, it requires fast updates of RF environment changes and configuration changes in neighbor eNodeBs. To enable these high-speed updates, the X2 interface has been introduced in the LTE standards to permit direct exchange of information between pairs of eNodeBs. This interface allows the exchange of near-real time information that can be used in many SON functionalities including mobility management, load management, configuration update, mobility robustness optimization and energy savings.

For example, the load information message between eNodeBs over an X2 interface can be used in a distributed SON load balancing scheme. Uplink interference overload information, downlink power scheduling information, and downlink almost blank subframe (ABS) information for time-domain interference coordination can be used to optimize transmit powers of LTE resources. The resource status update messages between eNodeBs provide radio resource, S1 transport network load (TNL), hardware load, and ABS status. Even though these resource status updates can be obtained over a northbound interface, receiving these messages over the X2 interface provides much faster and more frequent updates. Other messages that support distributed SON functions in eNodeBs, such as handover preparation, mobility parameter management, configuration update, radio link failure indication and handover report messages are also reported over the X2 interface.

Even though the X2 interface facilitates the implementation of distributed SON functions, there are other challenges to be resolved for distributed SON. First, parameter changes and some SON decisions executed at one eNodeB may trigger other radio environment changes at neighboring cells and cause parameter changes at these eNodeBs as well. The propagation of parameter changes may lead to a long transition period. Also, note that since decisions are made in a distributed fashion, the parameter changes may not reach a steady state. Second, local optimizations may not ensure overall network optimization. Hence a centralized SON approach may still be used to override radio parameter decision made by distributed SON. Therefore, parameter changes and interference coordination activities at the distributed SON need to be monitored by the centralized SON.

BRIEF SUMMARY OF THE INVENTION

Embodiments of this disclosure describe a proxy eNodeB, with which parameter changes and interference coordination activities can be monitored via X2 interface in real-time by a central management entity.

In an embodiment, a computer-implemented method for establishing a proxy base station in a communications network includes analyzing current network parameters, determining parameters for the proxy base station based on the analyzed network parameters, and transmitting the determined parameters for the proxy base station to an actual base station of the network. The communications network may be a Long Term Evolution (LTE) wireless network, and the parameters for the proxy base station may be transmitted over an X2 interface. The determined parameters may include a geographical location that is associated with the proxy base station.

In an embodiment, determining the geographical location includes determining a geographical location of the actual base station and setting a geographical location associated with the proxy base station such that it is considered to be a mobility neighbor of the first base station by the first base station. The geographical location associated with the proxy base station may be set to be the geographical location of the actual base station.

In an embodiment, analyzing current network parameters includes determining EUTRA Absolute Frequency Channel Number (EARFCN) and transmission bandwidth values for the actual base station, and determining parameters for the proxy base station includes setting EARFCN and transmission bandwidth values of the proxy base station to be the same as the actual base station. The determined parameters include a geographical location, a Physical Cell Identifier (PCI), an E-UTRAN Global Identifier (ECGI), a Type Allocation Code (TAC), a Public Land Mobile Network (PLMN) Identifier, and a plurality of Information Elements.

In an embodiment, transmitting the determined parameters includes transmitting a first set of parameters for a first type of base station to the actual base station, and transmitting a second set of parameters for a second type of base station to a second actual base station. Determining parameters for the proxy base station may include determining first parameters and determining second parameters that are different from the first parameters, and transmitting the determined parameters may include transmitting the first parameters to a first actual base station and transmitting the second parameters to a second actual base station.

In an embodiment, the method includes receiving High Interference Indicator (HII) information and Overload Indication (OI) information from the actual base station at the proxy base station, and receiving Relative Narrowband Transmit Power (RNTP) information from the actual base station at the proxy base station.

BRIEF DESCRIPTION OF THE DRAWINGS

FIG. 5 illustrates an embodiment of a process for providing a proxy base station.

FIG. 6 illustrates an embodiment of a process for communication over an X2 interface using a proxy base station.

DETAILED DESCRIPTION OF THE INVENTION

Figure 1:
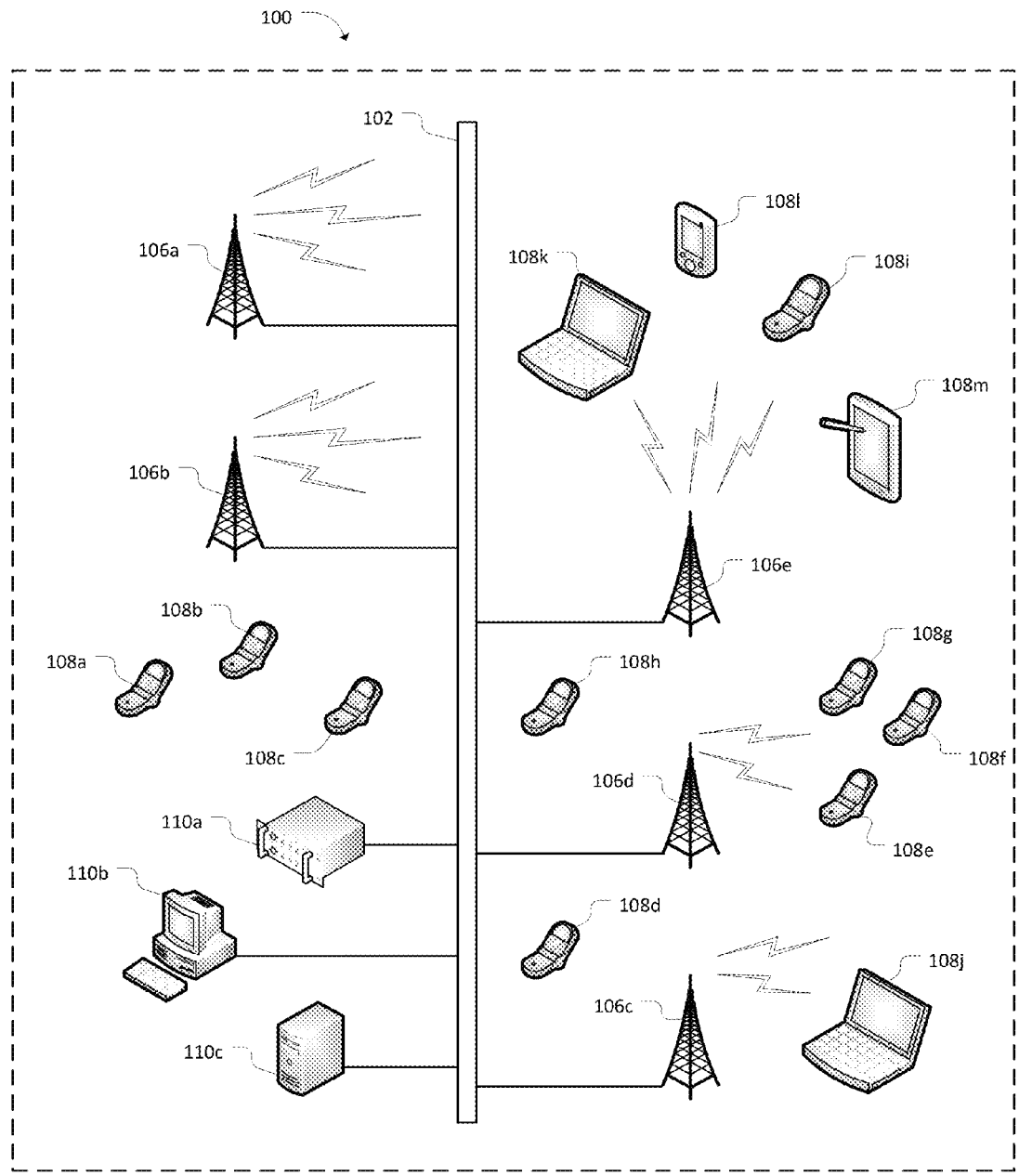
FIG. 1 illustrates a wireless communication system according to an embodiment.

In the following detailed description, reference is made to the accompanying drawings, which form a part of the description. The example embodiments described in the detailed description, drawings, and claims are not meant to be limiting. Other embodiments may be utilized, and other changes may be made, without departing from the spirit or scope of the subject matter presented herein. It will be understood that the aspects of the present disclosure, as generally described herein and illustrated in the drawings, may be arranged, substituted, combined, separated, and designed in a wide variety of different configurations.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of embodiments is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

FIG. 1 illustrates a networked computing system 100 according to an embodiment of this disclosure. As depicted, system 100 includes a data communications network 102, one or more base stations 106a-e, one or more network resource controller 110a-c, and one or more User Equipment (UE) 108a-m. As used herein, the term "base station" refers to a wireless communications station provided in a location and serves as a hub of a wireless network. The base stations may include macrocells, microcells, picocells, and femtocells.

In a system 100 according to an embodiment, the data communications network 102 may include a backhaul portion that can facilitate distributed network communications between any of the network controller devices 110a-c and any of the base stations 106a-e. Any of the network controller devices 110a-c may be a dedicated Network Resource Controller (NRC) that is provided remotely from the base stations or provided at the base station. Any of the network controller devices 110a-c may be a non-dedicated device that provides NRC functionality among others. Examples of network controller devices include Network Management Systems (NMSs) and Element Management Systems (EMSs). The one or more UE 108a-m may include cell phone devices 108a-i, laptop computers 108j-k, handheld gaming units 108l, electronic book devices or tablet PCs 108m, and any other type /of common portable wireless computing device that may be provided with wireless communications service by any of the base stations 106a-e.

As would be understood by those skilled in the Art, in most digital communications networks, the backhaul portion of a data communications network 102 may include intermediate links between a backbone of the network which are generally wire line, and sub networks or base stations 106a-e located at the periphery of the network. For example, cellular user equipment (e.g., any of UE 108a-m) communicating with one or more base stations 106a-e may constitute a local sub network. The network connection between any of the base stations 106a-e and the rest of the world may initiate with a link to the backhaul portion of an access provider's communications network 102 (e.g., via a point of presence).

In an embodiment, an NRC has presence and functionality that may be defined by the processes it is capable of carrying out. Accordingly, the conceptual entity that is the NRC may be generally defined by its role in performing processes associated with embodiments of the present disclosure. Therefore, depending on the particular embodiment, the NRC entity may be considered to be either a hardware component, and/or a software component that is stored in computer readable media such as volatile or non-volatile memories of one or more communicating device(s) within the networked computing system 100.

In an embodiment, any of the network controller devices 110a-c and/or base stations 106a-e may function independently or collaboratively to implement processes associated with various embodiments of the present disclosure.

In accordance with a standard GSM network, any of the network controller devices 110a-c (NRC devices or other devices optionally having NRC functionality) may be associated with a base station controller (BSC), a mobile switching center (MSC), a data scheduler, or any other common service provider control device known in the art, such as a radio resource manager (RRM). In accordance with a standard UMTS network, any of the network controller devices 110a-c (optionally having NRC functionality) may be associated with a NRC, a serving GPRS support node (SGSN), or any other common network controller device known in the art, such as an RRM. In accordance with a standard LTE network, any of the network controller devices 110a-c (optionally having NRC functionality) may be associated with an eNodeB base station, a mobility management entity (MME), or any other common network controller device known in the art, such as an RRM.

In an embodiment, any of the network controller devices 110a-c, the base stations 106a-e, as well as any of the UE 108a-m may be configured to run any well-known operating system, including, but not limited to: Microsoft® Windows®, Mac OS®, Google® Chrome®, Linux®, Unix®, or any mobile operating system, including Symbian®, Palm®, Windows Mobile®, Google® Android®, Mobile Linux®, etc. Any of the network controller devices 110a-c, or any of the base stations 106a-e may employ any number of common server, desktop, laptop, and personal computing devices.

In an embodiment, any of the UE 108a-m may be associated with any combination of common mobile computing devices (e.g., laptop computers, tablet computers, cellular phones, handheld gaming units, electronic book devices, personal music players, MiFi™ devices, video recorders, etc.), having wireless communications capabilities employing any common wireless data communications technology, including, but not limited to: GSM, UMTS, 3GPP LTE, LTE Advanced, WiMAX, etc.

In an embodiment, the backhaul portion of the data communications network 102 of FIG. 1 may employ any of the following common communications technologies: optical fiber, coaxial cable, twisted pair cable, Ethernet cable, and power-line cable, along with any other wireless communication technology known in the art. In context with various embodiments of the invention, it should be understood that wireless communications coverage associated with various data communication technologies (e.g., base stations 106a-e) typically vary between different service provider networks based on the type of network and the system infrastructure deployed within a particular region of a network (e.g., differences between GSM, UMTS, LTE, LTE Advanced, and WiMAX based networks and the technologies deployed in each network type).

Figure 2:
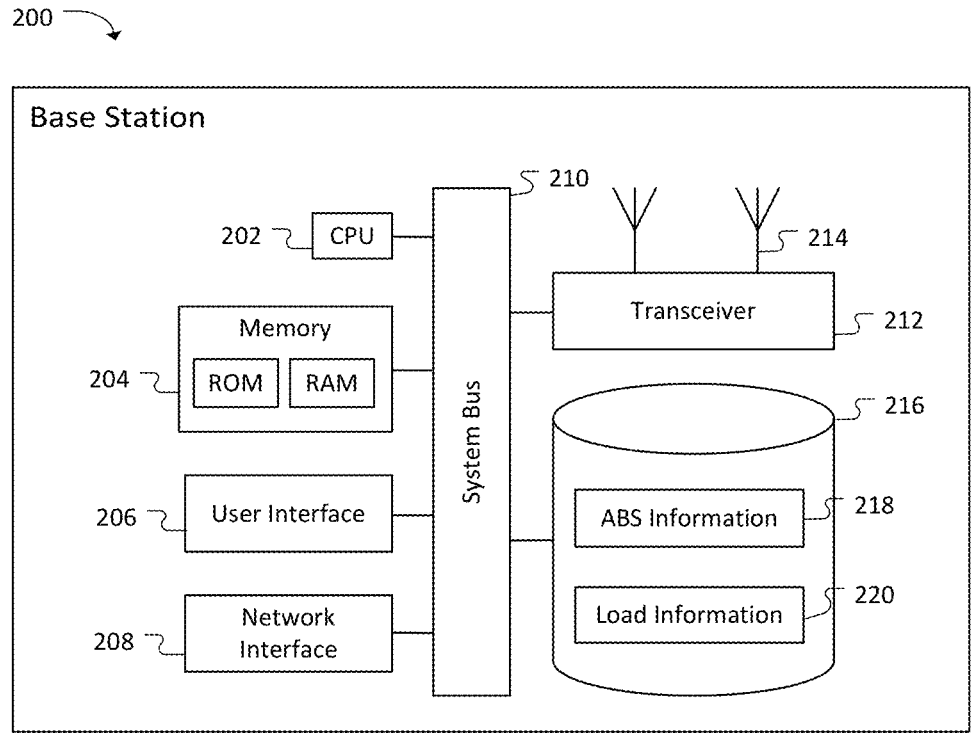
FIG. 2 illustrates a base station according to an embodiment.

FIG. 2 illustrates a block diagram of a base station 200 (e.g., a femtocell, picocell, microcell or macrocell) that may be representative of the base stations 106a-e in FIG. 1. In an embodiment, the base station 200 includes at least one central processing unit (CPU) 202. The CPU 202 may include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 202 is responsible for executing computer programs stored on volatile (RAM) and non-volatile (ROM) system memories 204.

Base station 200 may include a user interface 206 for inputting and retrieving data to and from the base station by operator personnel, and a network interface coupled to a wireline portion of the network. In an embodiment, the base station 200 may send and receive data to and from other network elements through network interface 208. In an embodiment, the X2 interface is part of the network interface. Meanwhile, base station 200 wirelessly sends and receives information to and from UE through transceiver 212, which is equipped with one or more antenna 214.

The base station 200 may further include a system bus 210 and data storage 216. The system bus facilitates communication between the various components of the base station. For example, system bus 210 may facilitate communication between a program stored in data storage 216 and CPU 202 which executes the program. In an embodiment, data storage 216 may store Almost Blank Subframe (ABS) information 218, and load information 220. In addition, data storage 216 may include an operating system, and various programs related to the operation of the base station 200.

In various embodiments, the base station 200 may use any modulation/encoding scheme known in the art such as Binary Phase Shift Keying (BPSK, having 1 bit/symbol), Quadrature Phase Shift Keying (QPSK, having 2 bits/symbol), and Quadrature Amplitude Modulation (e.g., 16-QAM, 64-QAM, etc., having 4 bits/symbol, 6 bits/symbol, etc.). Additionally, the base station 200 may be configured to communicate with UEs 108a-m via any Cellular Data Communications Protocol, including any common GSM, UMTS, WiMAX or LTE protocol.

Figure 3:
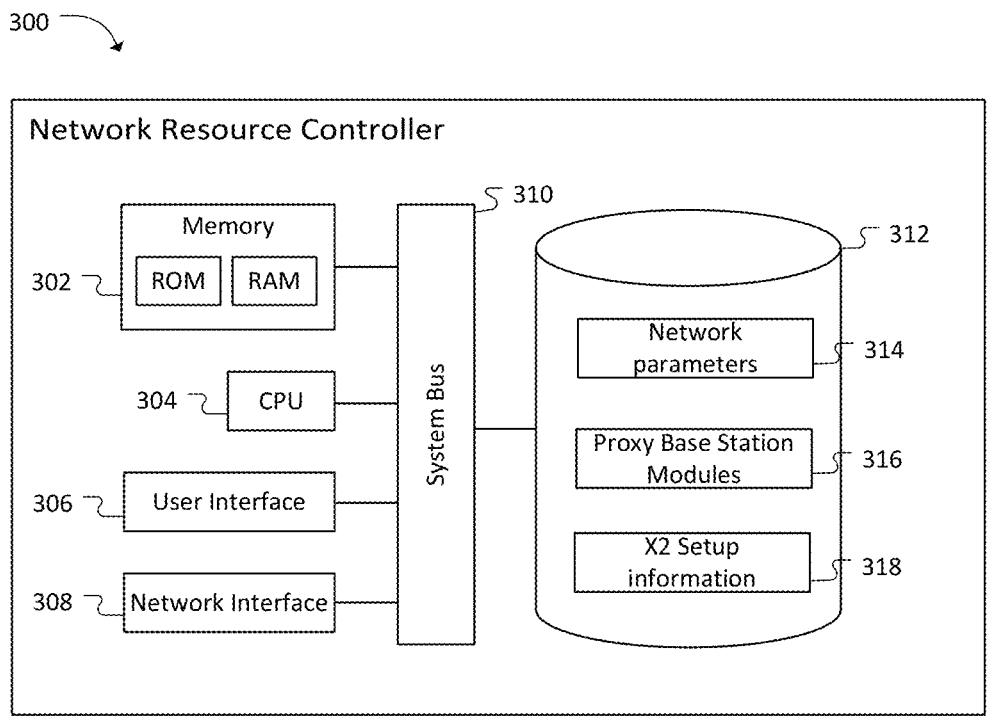
FIG. 3 illustrates a network resource controller according to an embodiment.

FIG. 3 illustrates a block diagram of an NRC 300 that may be representative of any of the network controller devices 110a-c. Accordingly, NRC 300 may be representative of a Network Management System (NMS) an Element Management System (EMS), or a Mobility Management Entity (MME). In an embodiment, one or more of the network controller devices 110a-c are SON controllers. The NRC 300 has one or more processor devices including a CPU 304.

The CPU 304 is responsible for executing computer programs stored on volatile (RAM) and nonvolatile (ROM) memories 302 and a storage device 312 (e.g., HDD or SSD). In some embodiments, storage device 312 may store program instructions as logic hardware such as an ASIC or FPGA. Storage device 312 may store, for example, network parameters 314, software modules 316 associated with a proxy base station, and X2 setup information 318. The modules associated with the proxy base station may include a parameter analysis module and a parameter determination module, and other modules for processing activities associated with the proxy base station.

The NRC 300 may also include a user interface 306 that allows an administrator to interact with the NRC's software and hardware resources and to display the performance and operation of the networked computing system 100. In addition, the NRC 300 may include a network interface 306 for communicating with other components in the networked computer system, and a system bus 310 that facilitates data communications between the hardware resources of the NRC 300.

In addition to the network controller devices 110a-c, the NRC 300 may be used to implement other types of computer devices, such as an antenna controller, an RF planning engine, a core network element, a database system, or the like. Based on the functionality provided by an NRC, the storage device of such a computer serves as a repository for software and database thereto.

Figure 4:
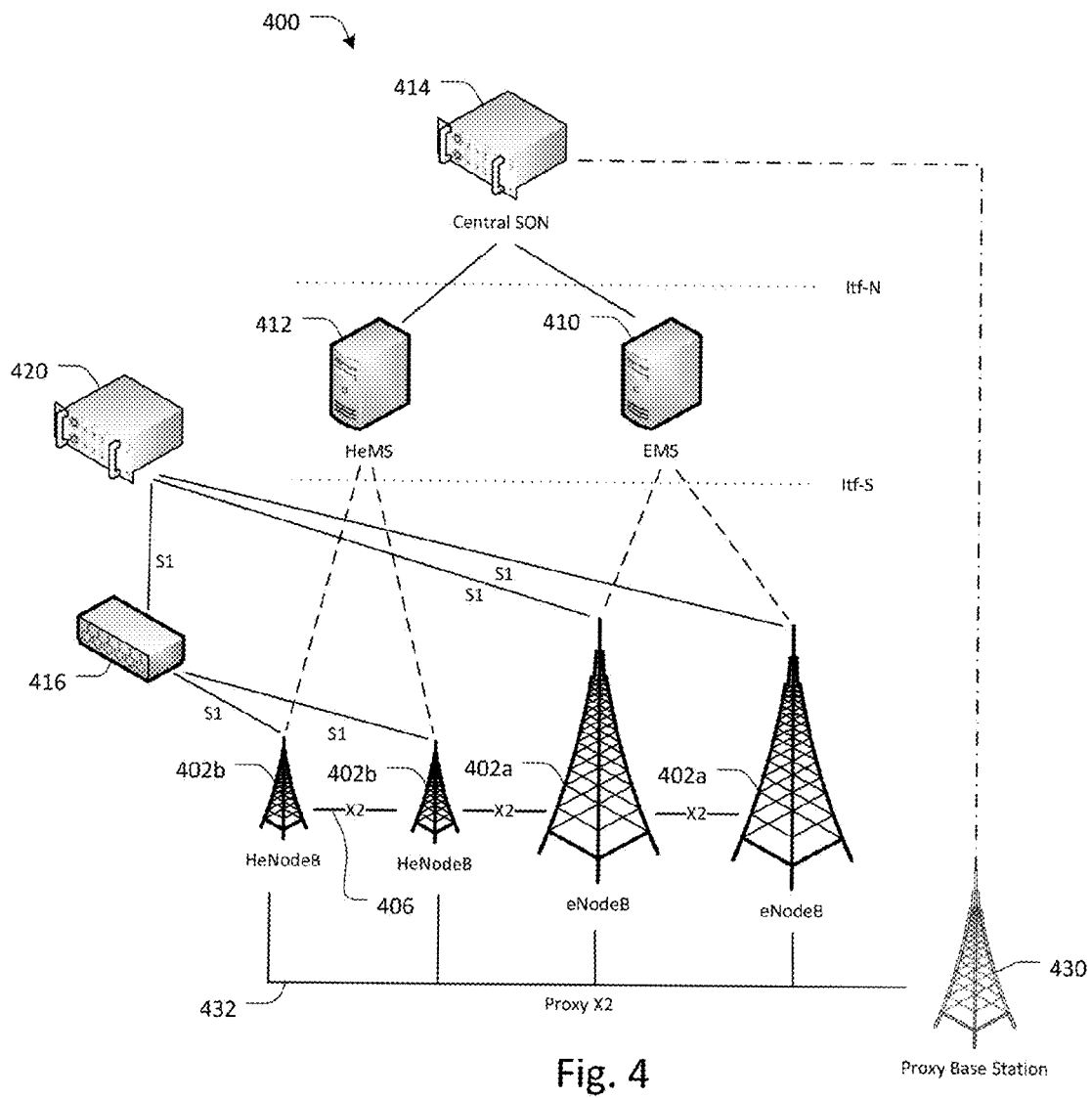
FIG. 4 illustrates an embodiment of a proxy base station in a cellular communications network.

FIG. 4 shows an embodiment of a proxy base station 430 in a cellular communications network 400. The cellular communications network includes a plurality of actual base stations 402, including a plurality of eNodeBs 402a and a plurality of smaller cells such as Home eNodeBs (HeNodeBs) 402b that are in communication with one another via X2 interface 406. While FIG. 4 only shows two types of base stations, other types of base stations providing wireless communication coverage may be coupled to one another via the X2 interface 406.

Each of the eNodeBs 402a is coupled to an Element Management System (EMS) 410, which is coupled to a central SON entity 414 such as an NRC 300. Each of the HeNodeBs 402b is coupled to a HeNodeB Management System (HeMS) 412, which is coupled to the central SON entity 414. In addition, the HeNodeBs 402b are coupled to a HeNodeB Gateway (HeNB-GW) 416 through an S1 interface. The eNodeBs 402a and the HeNB-GW 416 are coupled to an Evolved Packet Core (EPC) through Mobility Management Entity/System Architecture Evolution Gateway (SAE-GW) 420.

FIG. 4 also shows a proxy base station 430, which is coupled to the base stations 402 through proxy X2 connection 432. However, in other embodiments, proxy base station 430 may be implemented through stand-alone hardware or in other network hardware.

Proxy X2 connection 432 is labeled separately from X2 connection 406 in order to differentiate between entity connections. However, proxy X2 connection 432 may operate with the same parameters within the same standard as X2 connection 406. One or more proxy base station 430 may communicate with any number of base stations 402 in the network 400.

The proxy eNodeB 430 is a network component that emulates a base station 402 in the network 400. Base stations 402 of the network that are coupled to proxy base station 430 through proxy X2 connection 432 may perceive proxy base station 430 as a physical base station that provides wireless radio communications to user equipment.

A network 400 may include a plurality of proxy base stations 430. In an embodiment, each base station 402 of a network 400 may be coupled to at least one proxy base station 430. A base station 402 may be coupled to a plurality of proxy base stations 430 which are not known to other base stations in the network. In another embodiment, groups of base stations 402 are coupled to the same proxy base station 430. The NMS 414 may receive data from base stations 402 directly or indirectly through management systems 412 and 410.

FIG. 5 shows an embodiment of a process for providing a proxy base station 430 using an X2 interface. At S502, current network parameters of a network are analyzed. The current network parameters may include cell information such as the frequency, technology, size, type, and location of cells in a network. The current parameters may include information related to the base stations serving the cells, such as the number, type and location of base stations in a network, data that is used by the base stations such as Neighbor Relation Tables (NRT), and any other data related to existing base stations or cells in a network.

The current network parameters may be analyzed in order to determine parameters for a proxy base station 430 at S504. In an embodiment, the actual base stations 402 are not aware that the proxy base station is not an actual base station, so parameters for the proxy base station are set to fit within existing protocols and reporting structures across an X2 interface. Therefore, parameters of one or more proxy base station may be determined at S504 in order to communicate particular data with actual base stations in a network.

One parameter that may be determined for a proxy base station is its location. Locations (e.g. latitude and longitude coordinates) of one or more proxy base stations may be determined based on functions that the proxy base station 430 will perform. For example, if the proxy base station is established to receive mobility information for a particular sector of a network, then the location of the proxy base station may be set so that actual base stations 402 will report mobility information to the proxy base station. Similarly, if a user wishes to receive data reported over the X2 interface at edges of a network, then a proxy base station may present itself to actual base stations at the edge area using geographical coordinates that are within a network edge area.

In addition, S504 may determine a number of proxy base stations 430 to establish. More specifically, the number and locations of proxy base stations 402 may be established in conjunction with one another to establish a density of proxy base stations in a network area. The number and locations of base stations may be established so that proxy base stations receive data from one or more particular actual network base station over the X2 interface. Accordingly, analyzing current parameters S502 may include analyzing coverage and base station locations in a network, and determining proxy parameters S504 may include determining a number and locations of proxy base stations within a predetermined area.

In an embodiment, the number of proxy base stations 430 in a predetermined area is greater than the number of actual base stations 402 in the same area. In other embodiments, the ratio of proxy base stations to actual base stations may be 1:1, 1:5, 1:10, etc. Proxy base stations may have locations that are determined in order to receive data from or transmit data to particular actual base stations in a network over the X2 interface.

S504 may determine parameters that are used for a successful SETUP REQUEST routine across an X2 interface. A list 510 of such information is shown in FIG. 5. A Globally Unique Group Identifier (GU ID) includes an identity of the Public Land Mobile Network (PLMN ID) and a group identity of a mobility management entity (MME). A proxy base station 430 may use a GU Group ID that includes the PLMN ID and the MME ID of a PLMN and MME of target base stations in the network, which are base stations with which an operator wishes to establish proxy X2 communications. The proxy base station may be registered with the MME whose MME ID is included in the GU Group ID.

A Physical Cell ID (PCI) 430 for the proxy base station may be determined to avoid reuse of the PCI for target base stations with which the proxy base station communicates. Thus, for the PCI, S502 may include analyzing PCIs that are used in an area corresponding to the geographical coordinates used by the proxy base station, and S504 may include choosing a PCI that is not currently in use in that area.

An E-UTRAN Cell Global Identifier (ECGI) for the proxy base station may be selected to be compatible with target cells. In an embodiment, an ECGI is assigned for the proxy base station 430 by the central SON entity, but it also can be assigned by an EMS 410 or a HeMS 412 depending on the type of base station that the proxy base station emulates. In an embodiment, proxy base station may emulate a plurality of different types of base stations (e.g. femto, micro, and macro) to different actual base stations 402 of the network.

A Public Land Mobile Network (PLMN) ID and Tracking Area Code (TAC) may be determined for the proxy base station 430 based on the geographical coordinates of the proxy base station. E-UTRA Absolute Radio Frequency Channel Number (EARFCN) transmission bandwidths for upload and download channels may be arbitrarily determined for the proxy base station, or determined based on whether the EARFCN bandwidths would influence other aspects of network operations such as interference and neighbor management.

A plurality of Information Elements (IEs) used for SETUP are determined at S504 as well. A Closed Subscriber Group (CSG) ID IE and a Multimedia Broadcast Multicast Service (MBMS) Service Area Identity List IE may be determined based on geographical coordinates associated with the proxy base station. A Physical Random Access Channel (PRACH) Configuration IE may be selected arbitrarily, or based on exiting PRACH in use around the target base station. A Multicast Broadcast Single Frequency Network (MBSFN) Subframe Info IE, a MultibandInfoList IE, and a Number of Antenna Ports IE may be arbitrarily determined, or may be determined to provoke certain interactions with target base stations.

In addition, neighbor cell information is determined for the proxy base station 430 at S504. The neighbor cell information may be determined based on an analysis of base station locations at S502. For example, a planned geographic location may be analyzed by determining a geographical area centered around the location, and creating neighbor information based on those cells. In another embodiment, neighbor information may be determined by reading actual neighbor information from one or more base station near the geographical coordinates of the proxy base station to create proxy base station neighbor information. The neighbor cell information may include ECGI, PCI, EARFCN, TAC, and EARFCN Extensions for a plurality of neighbor cells.

In an embodiment, the proxy base station 430 is setup at S506. Setting up the proxy base station S506 may include registering a proxy base station 430 to an element management system that manages base stations similar to the type of base station emulated by the proxy base station. For example, if proxy base station 430 emulates an eNodeB, it may register with EMS 410. Similarly, if proxy base station 430 emulates a HeNodeB 402*b*, it may register with HeMS 412. Multiple proxy base stations may be registered at one or more element management system at S506.

In addition, a system registers proxy base station 430 with Mobility Management Entity (MME) 420 at S506. During registration, an MME 420 assigns a valid Internet Protocol (IP) address for the proxy base station 430, and the IP address is used as a source and destination IP address for sending and receiving information to and from base stations 402 through the X2 interface.

After obtaining a valid address, proxy base station 430 transmits a SETUP REQUEST message from the registered IP Address to one or more base station 402. The SETUP REQUEST message includes at least a portion of the parameters 510 that were determined at S504, so that the base station 402 receiving the SETUP REQUEST message perceives the proxy base station 430 as a valid base station. Examples of specific information in the SETUP REQUEST message may include:
  Physical Cell ID (PCI)
  Evolved Cell Global Identifier (ECGI)
  Tracking Area Code (TAC)
  Public Land Mobile Network (PLMN) ID
  DL/UL EARFCN and Transmission Bandwidth
  Number of Antenna Ports IE
  PRACH (Physical random access channel) Configuration IE
  MBSFN (multicast broadcast single frequency network) Subframe Info IE
  CSG (closed subscriber group) ID IE
  MBMS (multimedia broadcast multicast service) Service Area Identity List IE
  MultibandlnfoList IE
  Neighbor information including; ECGI, PCI, EARFCN, TAC, EARFCN Extension If an actual base station 402 does not accept the SETUP REQUEST, it will respond with an X2 SETUP FAILURE message with appropriate cause value. An example of an appropriate cause value is an Invalid MME Group ID. In addition, the X2 SETUP FAILURE message may include a Time To Wait IE, which is a time to wait before sending a second SETUP REQUEST message.

In response, a system may revise the value in the SETUP REQUEST message corresponding to the cause of the failure in the SETUP FAILURE message, wait for the Time To Wait, and submit the revised SETUP REQUEST message to the actual base station 402. If the setup process is successful, the actual base station 402 may transmit a SETUP RESPONSE message to the proxy base station 430, at which point the proxy base station communicates with the actual base station.

Although setting up the proxy base station 430 has been described with respect to a single proxy base station and a single actual base station 402, in some embodiments a plurality of SETUP REQUEST messages are sent to a plurality of actual base stations. Some of the SETUP REQUEST messages sent to multiple base stations may be the same, so that a single proxy base station 430 communicates with a plurality of actual base stations 402. For example, actual base stations may be divided into a plurality of groups, and one proxy base station 430 may be setup at S506 for each group.

In another embodiment, the number of proxy base stations 430 may be the same or greater than the number of actual base stations 402 to which they are attached. For example, one or more proxy base station 430 may be established and setup for an actual base station. When a plurality of proxy base stations are setup in a network, each of the proxy base stations may have different parameters 510 that are determined at S504 to be appropriate for the intended functions of that proxy base station.

FIG. 6 shows a process 600 for communication over an X2 interface using a proxy base station 430. After one or more proxy base station 430 is successfully setup in a network, the proxy base station will begin to communicate with one or more actual base station 402 via the X2 interface. Communications include receiving reported data S602 that is transmitted over the X2 interface from actual base stations to the proxy base station.

Data that is received by the proxy base station 430 at S602 may include load information messages, Information Elements (IEs) for overload, Almost Blank Subframes (ABS) and Relative Narrowband Transmit Power (RNTP). More specifically, the proxy base station may receive an upload interference overload indication IE indicating one of three interference indications (high, medium, and low) for Physical Resource Blocks (PRBs).

Another load information IE that may be received by proxy base station 430 is a Relative Narrowband Transmit Power (RNTP) IE. An RNTP IE indicates whether or not an RNTP threshold is exceeded for PRBs. Still another load information IE is an ABS Information IE, which may include information regarding an ABS pattern of the actual base station 402, including whether each subframe in a time period is or is not an ABS.

IEs received by the proxy base station 430 at S602 include resource status update messages, such as a Radio Resource Status IE. The Radio Resource Status IE includes data with respect to whether PRBs for Uplink and Downlink are Guaranteed Bit Rate (GBR) PRBs. Another resource status IE is the S1 Transport Network Load (TNL) Indicator IE, which indicates the status of the S1 TNL experienced by the cell through a load indicator (e.g. LowLoad, MediumLoad, HighLoad, and Overload).

Another type of information that the proxy base station 430 may retrieve over the X2 interface at S602 is load information. Examples of load information include uplink interference via Overload Indicator (OI) and a High Interference Indicator (HII) Information Elements, and downlink power via RNTP Information Elements.

Another resource status IE that may be received by proxy base station 430 from an actual base station 402 is a Hardware Load Indicator IE indicating a load status for hardware associated with the cell. In addition, an ABS status IE which indicates a percentage of used ABS resources and other ABS pattern information may be received.

Although several IEs are specifically described above, a proxy base station 430 may receive any information that is transmitted between base stations over the X2 interface. Some of the information received by the proxy base station 430 is information that is not otherwise available to central network entities such as a SON controller, and/or information that is not available at the times that information is reported over the X2 interface.

At S604, the data received by the proxy base station 430 over the X2 interface can be used to optimize aspects of the communications network. The centralized SON system may use the uplink interference information from each base station to determine better radio parameters for each base station. In a centralized SON system, since the population of user equipment and a geographical database are available to a central management entity, use of this information in conjunction with the information retrieved via X2 interface communications between the proxy base station 430 and an actual base station 402 can be used to determine more optimal settings for radio parameter adjustments to neighbor relation tables and decrease the uplink interference for each base station.

At S602, a centralized SON system may evaluate the RNTP and ABS pattern of each base station to see whether the power schedules and ABS patterns are optimal over the entire network. Since some base stations set their RNTP and ABS pattern based on only neighbor base station RNTP and ABS information over X2, their RNTP and ABS pattern may be sub-optimal when considered across a wider network area. The centralized SON system may determine better RNTP and ABS patterns for each base station. In an embodiment, the better pattern is delivered to each base station by a proprietary northbound interface.

When resource status reporting is retrieved by a proxy base station 430 over an X2 interface from actual base stations 402 in the network, the centralized SON system can identify the PRB usages, S1 TNL load, Hardware load, and ABS status. Even though some of this status information may also be retrieved as performance metrics (PM) data over a northbound interface with the element management system (e.g., over the LTE standard Itf-N interface), the information retrieved from the X2 interfaces by the proxy base station may be more timely in nature, leading to faster and more frequent updates. When the ABS information is not included in the load information from a base station, the proxy base station may request resource status report to those base stations and obtain the ABS status.

At S606, interoperability testing (IOT) may be conducted between network equipment. When operators deploy base stations provided by multiple vendors into their networks, they may perform interoperability testing prior to using the networks for paying customers. The proxy base station 430 may be used to perform some of this testing by retrieving messages passed over the X2 interfaces from base stations from multiple network vendors.

At S608, the proxy base station 430 may be used in a process of evaluating inter-cell interference coordination (ICIC) for a network. The implementation of distributed SON functions such as ICIC and enhanced ICIC may be implemented differently by different vendors. For LTE, aspects of ICIC that are not specified by the standards have been implemented through vendor-specific algorithms.

By creating a specific environment with co-channel interference, a proxy base station 430 can retrieve RNTP and ABS Information Elements from base stations being tested in order to determine whether different base stations from different vendors are yielding the same ICIC or e-ICIC actions or not.

At S610, the proxy base station 430 may be used to influence the behavior of one or more actual base station 402 in the network. Because actual base stations perceive the proxy base station as an actual base station, a proxy base station may transmit parameters in order to cause specific responses by actual base stations. For example, Information Elements such as OI and HII can be transmitted from a proxy base station to an actual base station to affect the scheduling behavior of the actual base station. Applications of S610 include troubleshooting, diagnosing, testing, and optimization. It should be recognized that there are many possible situations for which it is desirable to transmit information from the proxy base station to one or more actual base station.

Embodiments may be implemented in both centralized and distributed SON systems. In a centralized SON system, the proxy base station 430 may provide data that would not otherwise be available to a central management system, which the central server can use to determine optimal network parameters. In a distributed SON system, the proxy base station 430 may control power levels of actual base stations through RNTP messages.

Although specific embodiments have been explained with respect to the LTE telecommunications standard, it should be recognized that elements of this disclosure are applicable to other networked communications technologies.

What is claimed is:

1. A computer-implemented method for a communications network, the method comprising:
   establishing a proxy base station configured to emulate being an actual base station in the network, the proxy base station established by:
      analyzing current network parameters;
      determining parameters for the proxy base station based on the analyzed network parameters, the parameters including geographical coordinates representing an artificial location of the proxy base station; and
      transmitting the determined parameters for the proxy base station to a first actual base station of the network,
   receiving, by the proxy base station over an X2 interface, network information that is unavailable to a central SON controller at a time that the network information is received, and
   providing the network information to the central SON controller,
   wherein the proxy base station is a virtual base station, and the actual base station of the network perceives the proxy base station to be another actual base station.

2. The method of claim 1, wherein the communications network is a Long Term Evolution (LTE) wireless network, and the parameters for the proxy base station are transmitted over the X2 interface.

3. The method of claim 2, further comprising:
   receiving High Interference Indicator (HII) information and Overload Indication (OI) information from the first actual base station at the proxy base station.

4. The method of claim 2, further comprising:
   receiving Relative Narrowband Transmit Power (RNTP) information from the first actual base station at the proxy base station.

5. The method of claim 1, wherein determining the geographical location comprises:

determining a geographical location of the first actual base station; and setting a geographical location associated with the proxy base station such that it is considered to be a mobility neighbor of the first base station by the first base station.

6. The method of claim 5, wherein the geographical location associated with the proxy base station is set to be the geographical location of the first actual base station.

7. The method of claim 1, wherein analyzing current network parameters includes determining EUTRA Absolute Frequency Channel Number (EARFCN) and transmission bandwidth values for the first actual base station, and determining parameters for the proxy base station includes setting EARFCN and transmission bandwidth values of the proxy base station to be the same as the first actual base station.

8. The method of claim 1, wherein the determined parameters include a geographical location, a Physical Cell Identifier (PCI), an E-UTRAN Global Identifier (ECGI), a Type Allocation Code (TAC), a Public Land Mobile Network (PLMN) Identifier, and a plurality of Information Elements.

9. The method of claim 1, wherein transmitting the determined parameters includes transmitting a first set of parameters for a first type of base station to the first actual base station, and transmitting a second set of parameters for a second type of base station to a second actual base station.

10. The method of claim 1, wherein determining parameters for the proxy base station includes determining first parameters and determining second parameters that are different from the first parameters, and
wherein transmitting the determined parameters includes transmitting the first parameters to the first actual base station and transmitting the second parameters to a second actual base station.

11. The method of claim 1, wherein a plurality of proxy base stations are controlled by a central server.

12. The method of claim 1, wherein at least one proxy base station is established for each actual base station in a predetermined area.

13. A communications system comprising:
a processor;
a memory; and
a computer readable medium with non-transitory computer-readable instructions encoded thereon which, when executed by the processor, perform the following operations:
establishing a proxy eNodeB configured to emulate being an actual eNodeB in the network, the proxy eNodeB established by:
analyzing current network parameters;
determining parameters for the proxy eNodeB based on the analyzed network parameters, the parameters including geographical coordinates representing an artificial location of the proxy eNodeB; and
transmitting the determined parameters for the proxy eNodeB to an actual base station of the network,
receiving, by the eNodeB over an X2 interface, network information that is unavailable to a central SON controller at a time that the network information is received, and
providing the network information to the central SON controller,
wherein the proxy eNodeB is a virtual base station, and the actual base station of the network perceives the proxy eNodeB to be another actual eNodeB, and
wherein the processor is included in a server that controls a plurality of proxy eNodeBs.

14. The system of claim 13, wherein the communications system is a Long Term Evolution (LTE) wireless network, and the parameters for the proxy eNodeB are transmitted over the X2 interface.

15. The system of claim 13, wherein the geographical location is determined by:
determining a geographical location of the actual base station; and
setting a geographical location associated with the proxy eNodeB such that it is considered to be a mobility neighbor of the actual base station by the actual base station.

16. The system of claim 15, wherein the geographical location associated with the proxy eNodeB is set to be the geographical location of the actual base station.

17. The system of claim 13, wherein the current network parameters are determined by:
determining EUTRA Absolute Frequency Channel Number (EARFCN) and transmission bandwidth values for the actual eNodeB; and
determining parameters for the proxy base station includes setting EARFCN and transmission bandwidth values of the proxy base station to be the same as the actual eNodeB.

18. The system of claim 13, wherein the determined parameters include a geographical location, a Physical Cell Identifier (PCI), an E-UTRAN Global Identifier (ECGI), a Type Allocation Code (TAC), a Public Land Mobile Network (PLMN) Identifier, and a plurality of Information Elements.

19. The system of claim 13, the determined parameters are transmitted by:
transmitting a first set of parameters for a first type of base station to the actual eNodeB; and
transmitting a second set of parameters for a second type of base station to a second actual eNodeB.

20. A non-transitory computer readable medium with computer executable instructions stored thereon which, when executed by a processor, perform the following method:
establishing a proxy base station configured to emulate being an actual base station in the network, the proxy base station established by:
analyzing current network parameters;
determining parameters for the proxy base station based on the analyzed network parameters, the parameters including geographical coordinates representing an artificial location of the proxy base station; and
transmitting the determined parameters for the proxy base station to an actual base station of the network,
receiving, by the proxy base station over an X2 interface, network information that is unavailable to a central SON controller at a time that the network information is received, and
providing the network information to the central SON controller,
wherein the proxy base station is a virtual base station, and the actual base station of the network perceives the proxy base station to be another actual base station.

* * * * *